(12) United States Patent
Park et al.

(10) Patent No.: US 9,383,079 B2
(45) Date of Patent: Jul. 5, 2016

(54) BACKLIGHT UNIT AND DISPLAY APPARATUS HAVING THE SAME

(71) Applicant: Samsung Display Co., Ltd., Yongin (KR)

(72) Inventors: Changyong Park, Bucheon-si (KR); Young-Ran Son, Seoul (KR); Sang Hoon Lee, Hwaseong-si (KR); Seki Park, Hwaseong-si (KR); Luly Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 262 days.

(21) Appl. No.: 14/155,948

(22) Filed: Jan. 15, 2014

(65) Prior Publication Data

US 2015/0029697 A1    Jan. 29, 2015

(30) Foreign Application Priority Data

Jul. 24, 2013  (KR) ........................ 10-2013-0087549

(51) Int. Cl.
*F21V 7/00*    (2006.01)
*G02F 1/1335*    (2006.01)

(52) U.S. Cl.
CPC ............ *F21V 7/00* (2013.01); *G02F 1/133603* (2013.01); *G02F 1/133605* (2013.01)

(58) Field of Classification Search
CPC .................... G02F 1/133603; G02F 1/133605; G02F 1/133606; G02F 1/133608; F21V 7/00

USPC ........................................................ 362/97.1
See application file for complete search history.

(56) References Cited

U.S. PATENT DOCUMENTS

| 2007/0230206 | A1 | 10/2007 | Hsiao et al. |
| 2011/0090423 | A1* | 4/2011 | Wheatley .......... G02F 1/133605 349/62 |
| 2013/0063927 | A1 | 3/2013 | Lin et al. |

FOREIGN PATENT DOCUMENTS

| JP | 2010-033058 | 2/2010 |
| KR | 10-2008-0040975 | 5/2008 |
| KR | 10-2009-0040286 | 4/2009 |
| KR | 10-2010-0054700 | 5/2010 |
| KR | 101122722 | 3/2012 |

* cited by examiner

*Primary Examiner* — Anabel Ton
(74) *Attorney, Agent, or Firm* — H.C. Park & Associates, PLC

(57) ABSTRACT

A backlight unit including a bottom cover having a bottom surface and a sidewall extending from the bottom surface, light sources, and a reflection sheet. Outermost ones of the light sources are configured to include a first light source and a second light source. The first light source and the second light source have different distances from the sidewall. The reflection sheet includes a first reflection sheet disposed between the sidewall and the first light source and a second reflection sheet disposed between the sidewall and the second light source. The first reflection sheet and the second reflection sheet have different inclined angles from each other.

20 Claims, 5 Drawing Sheets

BACKLIGHT UNIT AND DISPLAY APPARATUS HAVING THE SAME

CROSS-REFERENCE TO RELATED APPLICATION

This U.S. non-provisional patent application claims priority from and the benefit of Korean Patent Application No. 10-2013-0087549, filed on Jul. 24, 2013, which is hereby incorporated by reference for all purposes as if fully set forth herein.

BACKGROUND

1. Field

Exemplary embodiments of the present invention relate to a backlight unit and a display apparatus having the backlight unit. More particularly, exemplary embodiments of the present invention relate to a backlight unit having a uniform brightness such that no stains are visible, and a display apparatus having the backlight unit.

2. Discussion of the Background

A transmissive display apparatus, such as a liquid crystal display, an electrophoretic display, an electrowetting display, etc., is not self-emissive and, therefore, requires a separate backlight unit to generate light. The backlight unit may be classified as either an edge-illumination type or a direct-illumination type in accordance with the position of a light source with respect to a display surface on which an image is displayed.

The direct-illumination type backlight unit does not require a light guide plate and a heat-discharge unit and, thus, a manufacturing cost is relatively low when compared to that of the edge-illumination type backlight unit. In addition, because a loss in light of the direct-illumination type backlight unit is less than that of the edge-illumination type backlight unit, the direct-illumination type backlight unit provides a greater brightness than that of the edge-illumination type backlight unit at the same voltage.

However, stains may become visible at edges of the direct-illumination type backlight unit based on the arrangement of the light source.

The above information disclosed in this Background section is only for enhancement of understanding of the background of the invention and, therefore, it may contain information that does not constitute prior art.

SUMMARY

Exemplary embodiments of the present invention provide a backlight unit having a uniform brightness at an edge such that no stains are visible.

Exemplary embodiments of the present invention also provide a display apparatus having the backlight unit.

Additional features of the invention will be set forth in the description which follows, and in part will become apparent from the description, or may be learned by practice of the invention.

An exemplary embodiment of the present invention discloses a backlight unit including a bottom cover, light sources, and a reflection sheet. The bottom cover includes a bottom surface and a sidewall extending from the bottom surface. The light sources are disposed on the bottom surface. The reflection sheet is disposed on an inner surface of the sidewall.

The outermost ones of the light sources include a first light source and a second light source. The first light source is spaced apart from the sidewall in a first direction by a first distance. The second light source is spaced apart from the sidewall in the first direction by a second distance different from the first distance.

The reflection sheet includes a first reflection sheet and a second reflection sheet. The first reflection sheet is disposed between the sidewall and the first light source and has a first inclined angle. The second reflection sheet is disposed between the sidewall and the second light source and has a second inclined angle different from the first inclined angle.

An exemplary embodiment of the present invention also discloses a display apparatus including a display panel configured to display an image, and the above-described backlight unit configured to provide a light to the display panel.

According to the above, the display apparatus includes the reflection sheets having different lengths and different inclined angles in accordance with the arrangement positions of the outermost light sources. Thus, the display apparatus may provide uniform brightness and prevent stains from becoming visible.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
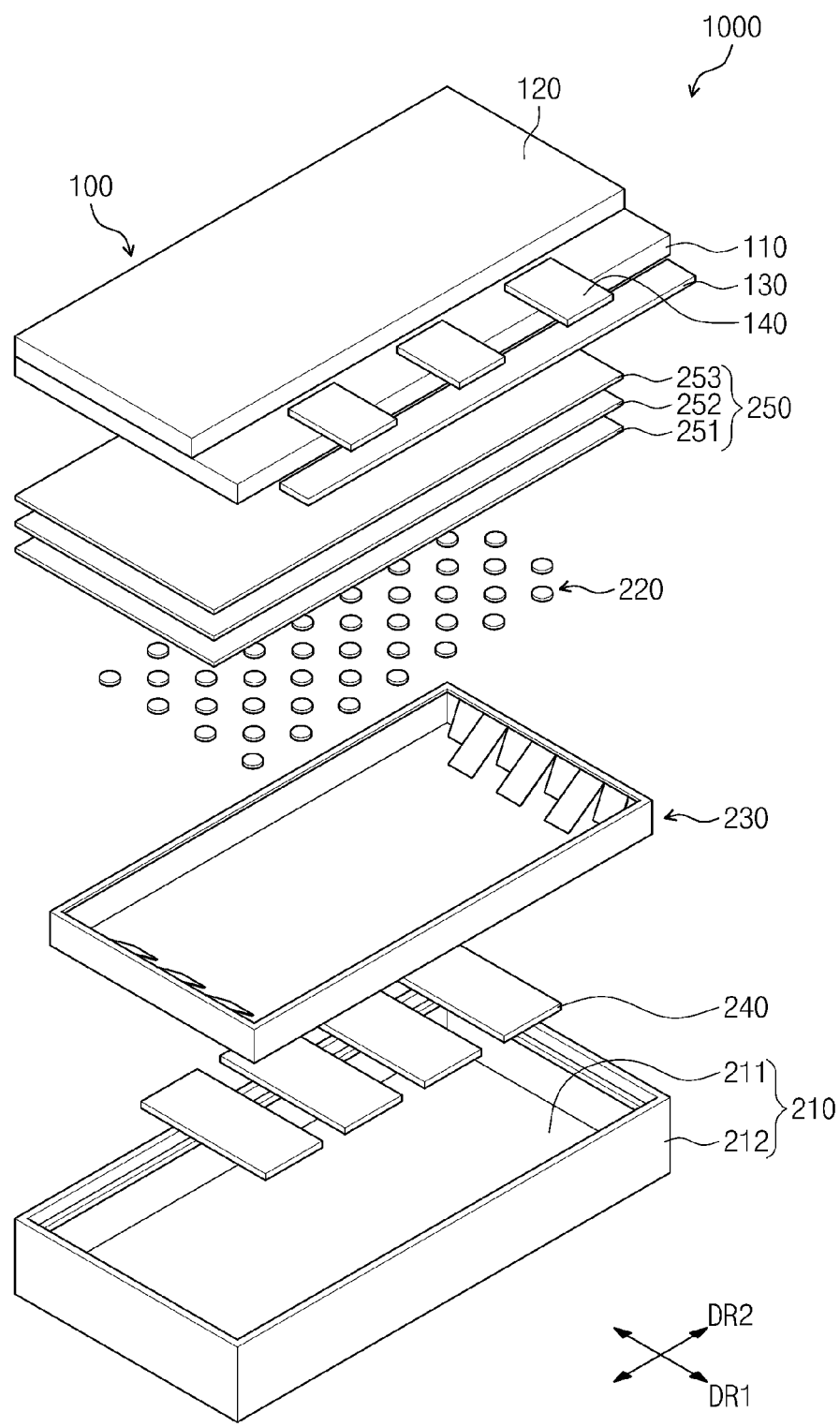
FIG. 1 is an exploded perspective view showing a display apparatus according to an exemplary embodiment of the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of elements may be exaggerated for clarity. Like reference numerals in the drawings denote like elements.

It will be understood that when an element or layer is referred to as being "on", "connected to", or "coupled to" another element or layer, it can be directly on, connected to, or coupled to the other element or layer, or intervening elements or layers may be present. In contrast, when an element is referred to as being "directly on," "directly connected to", or "directly coupled to" another element or layer, there are no intervening elements or layers present. As used herein, the term "and/or" includes any and all combinations of one or more of the associated listed items. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

It will be understood that, although the terms first, second, etc. may be used herein to describe various elements, components, regions, layers, and/or sections, these elements, components, regions, layers, and/or sections should not be limited by these terms. These terms are only used to distinguish one element, component, region, layer or section from another region, layer or section. Thus, a first element, component, region, layer, or section discussed below could be termed a second element, component, region, layer, or section without departing from the teachings of the present disclosure.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the disclosure. As used herein, the singular forms, "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be explained in detail with reference to the accompanying drawings.

FIG. 1 is an exploded perspective view showing a display apparatus 1000 including a display panel 100 and a backlight unit 200. The display panel 100 receives light from the backlight unit 200 to display an image. The display panel 100 is a non-self-emissive display panel, such as a liquid crystal display panel, and hereinafter, the liquid crystal display panel will be described as the display panel 100.

The display panel 100 includes a lower substrate 110, an upper substrate 120 facing the lower substrate 110, and a liquid crystal layer interposed between the lower substrate 110 and the upper substrate 120. The lower substrate 110 includes gate lines, data lines, and pixels defined by the gate lines and the data lines. Each pixel includes a thin film transistor. The upper substrate 120 includes color filters and a black matrix. The color filters are disposed to correspond to the pixels. The black matrix is disposed between the color filters to correspond to the gate lines, the data lines, and the thin film transistor.

The display apparatus 1000 may further include a printed circuit board 130 and a flexible printed circuit board 140. The printed circuit board 130 may include a driver mounted thereon to drive the display panel 100. The driver generates various driving signals, and applies the driving signals to the display panel 100 through the flexible printed circuit board 140. The flexible printed circuit board 140 electrically connects the display panel 100 to the printed circuit board 130. The flexible printed circuit board 140 may be a tape carrier package (TCP) or a chip on film (COF).

The backlight unit 200 includes a bottom cover 210, a light source 220, a reflection sheet 230, a driving substrate 240, and an optical sheet 250.

The bottom cover 210 includes a containing space to accommodate the light source 220, the reflection sheet 230, the driving substrate 240, and the optical sheet 250 therein.

The bottom cover 210 includes a bottom surface 211 and a sidewall 212 extending from the bottom surface 211. In FIG. 1, an outer surface and an inner surface of the sidewall 212 extend in a direction substantially perpendicular to the bottom surface 211. However, the inner surface of the sidewall 212 may be inclined with respect to the bottom surface 211. The sidewall 212 has a stepped portion at an upper side part thereof to support the optical sheet 250. As shown in FIG. 1, the bottom surface 211 has a rectangular shape, and the sidewall 212 includes four sidewalls respectively extending from four sides of the bottom surface 211. Hereinafter, a long side direction of the bottom surface 211 is referred to as a first direction DR1, and a short side direction of the bottom surface 211 is referred to as a second direction DR2.

The light source 220 is provided as a plurality of light sources 220 disposed on the bottom surface 211. The light sources 220 emit a light in response to a light source driving signal applied from the driving substrate 240. Each light source 220 may be a light emitting diode. Detailed descriptions of the arrangement of the light source 220 will be described later.

The reflection sheet 230 is disposed on an inner surface of the bottom cover 210 and below the light sources 220. In detail, the reflection sheet 230 is disposed between the bottom surface 211 and the light sources 220, and the reflection sheet 230 is disposed on an upper surface and the inner surface of the sidewall 212. The reflection sheet 230 reflects most of the light incident thereto. Detailed descriptions on the reflection sheet 230 will be described later.

The driving substrate 240 is disposed between the bottom surface 211 and the reflection sheet 230. The driving substrate 240 is electrically connected to the light sources 220 to apply the light source driving signal to the light sources 220. The driving substrate 240 may be provided as a plurality of driving substrates 240, and four driving substrates 240 are shown as a representative example in FIG. 1. One driving substrate 240 may be electrically connected to corresponding light sources.

The optical sheet 250 is accommodated in the stepped portion formed on the sidewall 212. The optical sheet 250 includes a diffusion sheet 251, a condensing sheet 252, and a protection sheet 253, which are sequentially stacked one on another. The diffusion sheet 251 diffuses the incident light. The condensing sheet 252 condenses the light diffused by the diffusion sheet 251 to enhance the brightness. The protection sheet 253 protects the condensing sheet 252 and secures the viewing angle. In FIG. 1, the optical sheet 250 includes three optical sheets, but the present invention is not so limited, and the optical sheet 250 may include, for example, four or more optical sheets.

Figure 2:
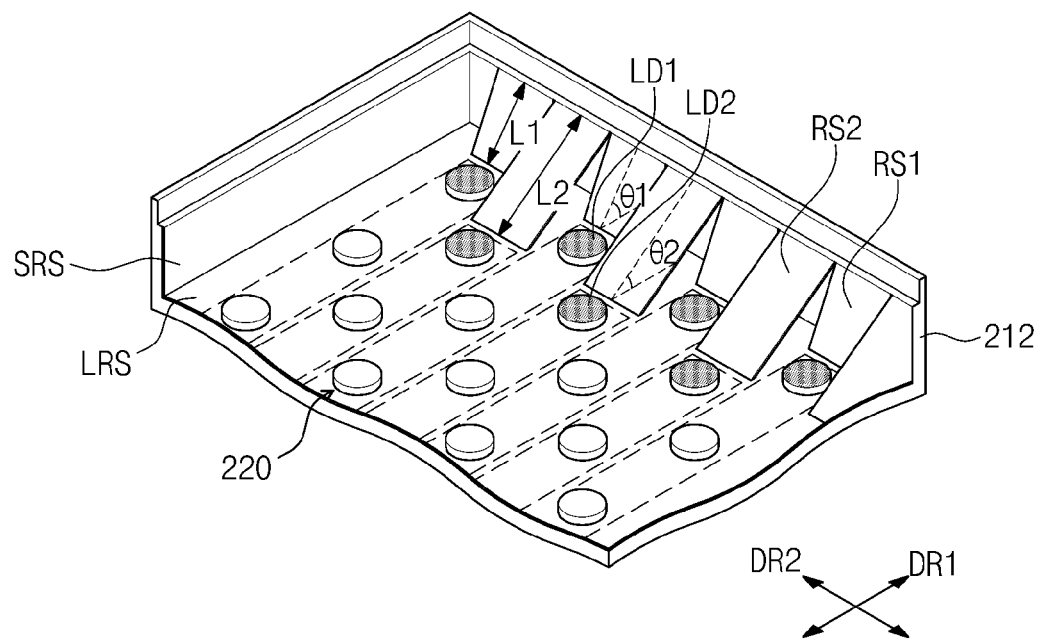
FIG. 2 is a perspective view showing a portion of a backlight unit shown in FIG. 1.
Figure 3:
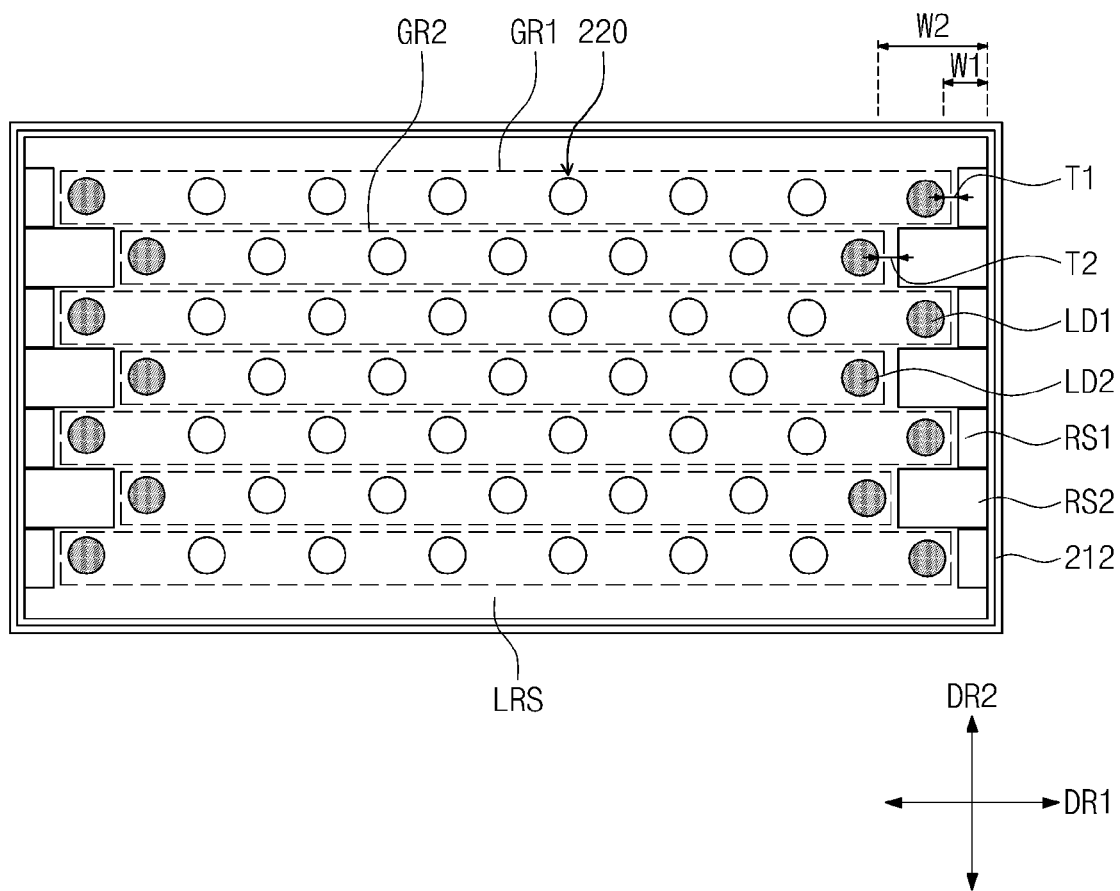
FIG. 3 is a plan view showing the backlight unit shown in FIG. 1.

FIG. 2 is a perspective view showing a portion of the backlight unit shown in FIG. 1, and FIG. 3 is a plan view showing the backlight unit shown in FIG. 1.

Hereinafter, detailed descriptions on the light source 220 and the reflection sheet 230 will be described with reference to FIGS. 2 and 3.

The light sources 220 may include a first light source group GR1 and a second light source group GR2. Each of the first and second light source groups GR1 and GR2 is arranged substantially in parallel to the first direction DR1 and includes light sources that are uniformly spaced apart from each other. At least one light source of the first light source group GR1 and at least one light source of the second light source group GR2 are alternately arranged in the second direction D2. In FIG. 3, one light source of the first light source group GR1 and one light source of the second light source group GR2 are alternately arranged in the second direction DR2.

The light sources of the first light source group GR1 are disposed between the light sources of the second light source group GR2 in the first direction DR1. In detail, the light sources of the first light source group GR1 may be shifted in the first direction DR1 by half of the distance between the two adjacent light sources when compared to the light sources of the second light source group GR2. Four adjacent light sources among the light sources of the first and second light source groups GR1 and GR2 are arranged in a diamond shape. However, the arrangement of the light sources 220 should not be limited thereto or thereby, and the arrangement of the light sources 220 may vary when a first light source LD 1 and a second light source LD2, which will be described later, have different distances from the sidewall 212 in the first direction DR1.

The light sources 220 are configured to include outermost light sources. The outermost light sources are the light sources disposed at outermost positions among the light sources arranged in the same line in the first direction DR1. In FIGS. 2 and 3, the outermost light sources in each of the first and second light source groups GR1 and GR2 are shown with shading, and the light sources arranged between the outermost light sources are shown with no shading. The outermost light sources may be arranged in a zigzag shape along the second direction DR2, as shown in FIG. 2.

The outermost light sources are configured to include the first light source LD1 and the second light source LD2. The first light source LD1 is spaced apart from the sidewall 212 by a first distance W1 in the first direction DR1. The second light source LD2 is spaced apart from the sidewall 212 by a second distance W2, which is different from the first distance W1, in the first direction DR1. In the present exemplary embodiment, the first distance W1 is less than the second distance W2.

The reflection sheet 230 includes a first reflection sheet RS 1, a second reflection sheet RS2, and a lower reflection sheet LRS. The lower reflection sheet LRS may be disposed between the light sources 220 and the bottom surface 221.

The first reflection sheet RS 1 and the second reflection sheet RS2 are disposed along at least one sidewall. In the present exemplary embodiment, the first reflection sheet RS1 and the second reflection sheet RS2 are respectively disposed along two sidewalls protruding from the short sides of the bottom surface 211 and facing each other. A side reflection sheet SRS, which is integrally formed with the lower reflection sheet LRS, may be further disposed on inner surfaces of the two sidewalls, which extend from the long sides of the bottom surface 211.

The first reflection sheet RS1 is disposed between the sidewall 212 and the first light source LD1 in the first direction DR1 and has a first inclined angle. The first reflection sheet RS 1 extends from the upper surface of the sidewall 212 and is connected to the lower reflection sheet LRS. The first reflection sheet RS 1 forms a first angle $\Theta1$ with respect to the lower reflection sheet LRS.

The second reflection sheet RS2 is disposed between the sidewall 212 and the second light source LD2 in the first direction DR1, and has a second inclined angle, which is different from the first inclined angle. The second reflection sheet RS2 extends from the upper surface of the sidewall 212 and is connected to the lower reflection sheet LRS. The second reflection sheet RS2 forms a second angle $\Theta2$, which differs from the first angle $\Theta1$, with respect to the lower reflection sheet LRS. The first angle $\Theta1$ is greater than the second angle $\Theta2$, and the first inclined angle is greater than the second inclined angle.

A length L1 in the inclined direction of the first reflection sheet RS1 is less than a length L2 in the inclined direction of the second reflection sheet RS2. A width of the first reflection sheet RS1 in the second direction DR2 is equal to a width of the second reflection sheet RS2 in the second direction DR2. Specifically, each of the first reflection sheet RS1 and the second reflection sheet RS2 have a width equal to a distance between two light sources, which are adjacent to each other in the second direction DR2 and included in the same light source group.

A distance T1 between the first reflection sheet RS 1 and the first light source LD1 in the first direction DR1 may be equal to a distance T2 between the second reflection sheet RS2 and the second light source LD2 in the first direction DR1.

The first reflection sheet RS 1 and the second reflection sheet RS2 may be connected to each other at an upper portion thereof, and may be integrally formed with each other. In addition, the first reflection sheet RS1, the second reflection sheet RS2, the lower reflection sheet LRS, and the side reflection sheet SRS may be integrally formed with each other.

When the first and second reflection sheets RS1 and RS2 are not employed to the backlight unit 200, the brightness distribution of the backlight unit becomes non-uniform due to a difference in distance between each of the first and second light sources LD1 and LD2 and the sidewall 212, and thus, stains may be visible. That is, when side reflection sheets are disposed on all inner surfaces of the sidewall 212 without using the first and second reflection sheets RS 1 and RS2, surrounding areas of the first light source LD1 become relatively more bright as a result of a shorter distance between the first light source LD1 and the sidewall 212, and surrounding areas of the second light source LD2 become relatively darker as a result of a longer distance between the second light source LD2 and the sidewall 212.

In the present exemplary embodiment, the backlight unit 200 includes the first reflection sheet RS1 and the second reflection sheet RS22 having different lengths and different inclination angles according to the arrangement of the first light source LD1 and the second light source LD2. Thus, the backlight unit 200 may provide the uniform brightness in the surrounding areas of the first light source LD1 and the second light source LD2, resulting in the prevention of visible stains.

Figure 4:
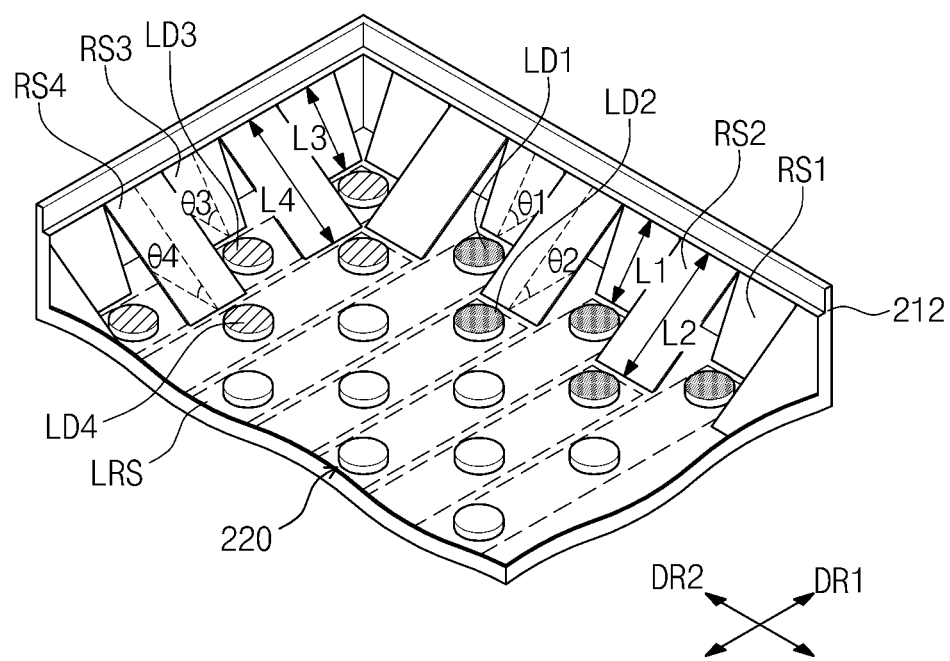
FIG. 4 is a perspective view showing a portion of a backlight unit according to another exemplary embodiment of the present invention.
Figure 5:
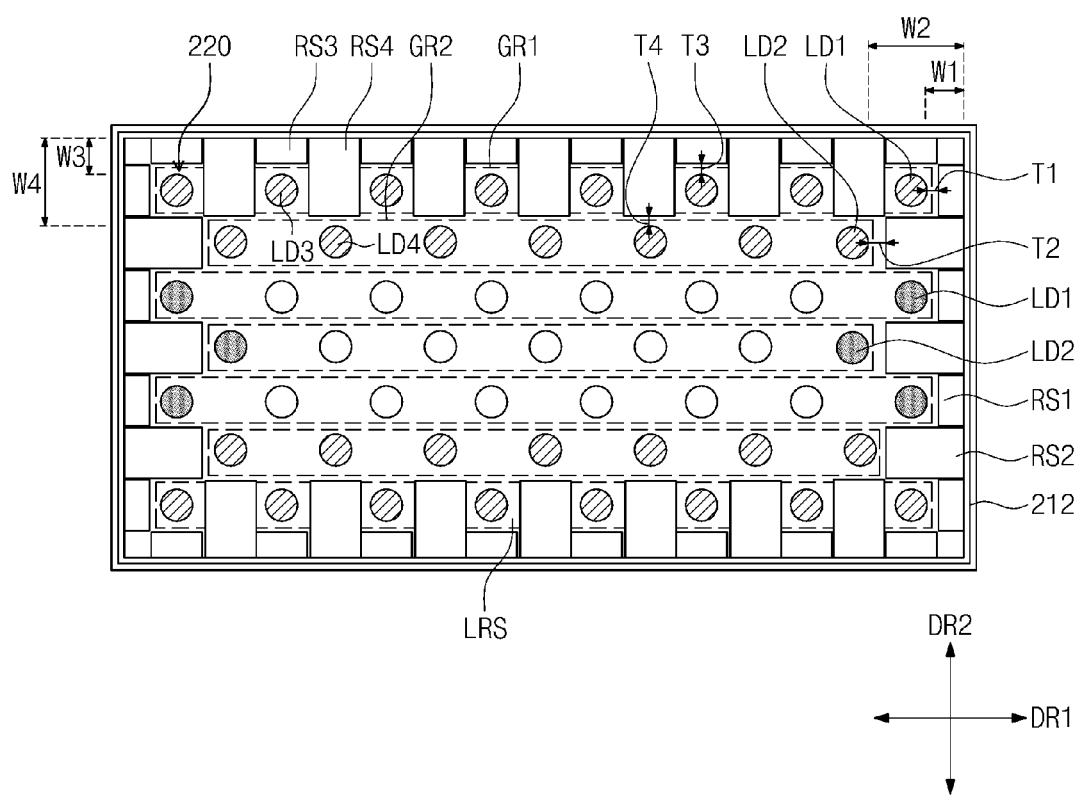
FIG. 5 is a plan view showing a backlight unit according to another exemplary embodiment of the present invention.

FIG. 4 is a perspective view showing a portion of a backlight unit according to another exemplary embodiment of the present disclosure, and FIG. 5 is a plan view showing a backlight unit according to that exemplary embodiment.

The backlight unit shown in FIGS. 4 and 5 has the same structure and function as those of the backlight unit described with reference to FIGS. 2 and 3, except that the backlight unit shown in FIGS. 4 and 5 further includes a third reflection sheet and a fourth reflection sheet. Thus, hereinafter descriptions will be focused on the third and fourth reflection sheets in FIGS. 4 and 5.

Light sources 220 include outermost light sources. The outermost light sources are configured to include first outermost light sources disposed at outermost positions among the light sources arranged on the same line in the first direction DR1, and second outermost light sources disposed at outermost positions among the light sources arranged on the same line in the second direction DR2. In FIGS. 4 and 5, the first outermost light sources are shown with shading, the second outermost light sources are shown with a hatching pattern, and the other light sources are shown without shading or the hatching pattern. Light sources corresponding to both of the first and second outermost light sources may exist in the light sources 220. Because the second outermost light sources will be mainly described with reference to FIGS. 4 and 5, for the convenience of explanation, the light sources corresponding to both of the first and second outermost light sources are shown with the hatching pattern.

The first outermost light sources are configured to include a first light source LD1 and a second light source LD2. Because the first light source LD1, the second light source LD2, the first reflection sheet RS 1, and the second reflection sheet RS2 have the same structure and function as those of the first light source LD1, the second light source LD2, the first reflection sheet RS1, and the second reflection sheet RS2 shown in FIGS. 2 and 3, detailed descriptions thereof will be omitted.

The second outermost light sources are configured to include a third light source LD3 and a fourth light source LD4. The third light source LD3 is spaced apart from a sidewall 212 by a third distance W3 in a second direction DR2. The fourth light source LD4 is spaced apart from the sidewall 212 by a fourth distance W4, which is different from the third distance W3, in the second direction DR2. In the present exemplary embodiment, the third distance W3 is less than the fourth distance W4.

The reflection sheet 230 may further include the third reflection sheet RS3 and the fourth reflection sheet RS4. The third reflection sheet RS3 and the fourth reflection sheet RS4 are disposed along at least one sidewall. In the present exemplary embodiment, the third and fourth reflection sheets RS3 and RS4 are disposed along two sidewalls protruding from long sides of the bottom surface 211 and facing each other.

The third reflection sheet RS3 is disposed between the sidewall 212 and the third light source LD3 in the second direction DR2, and has a third inclined angle. The third reflection sheet RS3 extends from an upper surface of the sidewall 212 and is connected to a lower reflection sheet LRS. The third reflection sheet RS3 makes a third angle θ3 with respect to the lower reflection sheet LRS.

The fourth reflection sheet RS4 is disposed between the sidewall 212 and the fourth light source LD4 in the second direction DR2, and has a fourth inclined angle, which differs from the third inclined angle. The fourth reflection sheet RS4 extends from the upper surface of the sidewall 212 and is connected to the lower reflection sheet LRS. The fourth reflection sheet RS4 forms a fourth angle Θ4, which differs from the third angle Θ3, with respect to the lower reflection sheet LRS. The third angle Θ3 is greater than the fourth angle Θ4, and the third inclined angle is greater than the fourth inclined angle.

A length L3 in the inclined direction of the third reflection sheet RS3 is less than a length L4 in the inclined direction of the fourth reflection sheet RS4. A width of the third reflection sheet RS3 in a first direction DR1 is equal to a width of the fourth reflection sheet RS4 in the first direction DR1. Specifically, each of the third reflection sheet RS3 and the fourth reflection sheet RS4 has a width equal to a distance between two light sources adjacent to each other in the first direction DR1.

A distance T3 in the second direction DR2 between the third reflection sheet RS3 and the third light source LD3 is equal to a distance T4 in the second direction DR2 between the fourth reflection sheet RS4 and the fourth light source LD4.

The third reflection sheet RS3 and the fourth reflection sheet RS4 may be connected to each other at an upper portion thereof and integrally formed with each other. In addition, the first reflection sheet RS1, the second reflection sheet RS2, the third reflection sheet RS3, the fourth reflection sheet RS4, the lower reflection sheet LRS, and side reflection sheet SRS may also be integrally formed with each other.

In the backlight unit according to another exemplary embodiment, a distance between two adjacent light sources in the first direction DR1 may be greater than a distance between two adjacent light sources in the second direction DR2. This is because the stains may be visible along the long sides of the bottom surface 211 when the distance between two adjacent light sources in the first direction DR1 is greater than the distance between two adjacent light sources in the second direction DR2,. The distance between two adjacent light sources in the first direction DR1 may be at least two times greater than the distance between two adjacent light sources in the second direction DR2.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A backlight unit, comprising:
    a bottom cover comprising a bottom surface and a sidewall extending from the bottom surface;
    light sources disposed on the bottom surface; and
    a reflection sheet disposed on an inner surface of the sidewall, outermost ones of the light sources comprising:
        a first light source spaced apart from the sidewall in a first direction by a first distance; and
        a second light source spaced apart from the sidewall in the first direction by a second distance different from the first distance,
    wherein the reflection sheet comprises:
        a first reflection sheet disposed between the sidewall and the first light source at a first inclined angle with respect to the bottom surface, and
        a second reflection sheet disposed between the sidewall and the second light source at a second inclined angle different from the first inclined angle with respect to the bottom surface.

2. The backlight unit of claim 1, wherein:
    the first light source comprises a plurality of first light sources arranged in a first line in the first direction, and the second light source comprises a plurality of second light sources arranged in a second line in the first direction.

3. The backlight unit of claim 1, wherein the length of the first reflection sheet differs from the length of the second reflection sheet.

4. The backlight unit of claim 3, wherein:
the first distance is less than the second distance,
the first inclined angle is greater than the second inclined angle, and
the length of the first reflection sheet is less than the length of the second reflection sheet.

5. The backlight unit of claim 1, wherein the first reflection sheet has a width equal to a width of the second reflection sheet.

6. The backlight unit of claim 1, wherein a distance between the first reflection sheet and the first light source in the first direction is equal to a distance between the second reflection sheet and the second light source in the first direction.

7. The backlight unit of claim 1, further comprising a driving substrate disposed between the bottom surface and the reflection sheet,
wherein the driving substrate is electrically connected to the light sources.

8. The backlight unit of claim 1, wherein the outermost light sources are the light sources disposed at outermost positions, which are arranged either in a same line along the first direction or in a second direction substantially perpendicular to the first direction.

9. The backlight unit of claim 8, wherein:
the outermost light sources further comprise:
a third light source spaced apart from the sidewall in the second direction by a third distance; and
a fourth light source spaced apart from the sidewall in the second direction by a fourth distance different from the third distance, and
the reflection sheet comprises:
a third reflection sheet disposed between the sidewall and the third light source at a third inclined angle with respect to the bottom surface; and
a fourth reflection sheet disposed between the sidewall and the fourth light source at a fourth inclined angle different from the third inclined angle with respect to the bottom surface.

10. The backlight unit of claim 9, wherein the length of the third reflection sheet differs from the length of the fourth reflection sheet.

11. The backlight unit of claim 10, wherein:
the third distance is less than the fourth distance,
the third inclined angle is greater than the fourth inclined angle, and
the length of the third reflection sheet is less than the length of the fourth reflection sheet in the inclined direction.

12. The backlight unit of claim 9, wherein the width of the third reflection sheet is equal to the width of the fourth reflection sheet.

13. The backlight unit of claim 9, wherein a distance between the third reflection sheet and the third light source in the second direction is equal to a distance between the fourth reflection sheet and the fourth light source in the second direction.

14. The backlight unit of claim 9, wherein a distance between two adjacent light sources in the first direction is greater than a distance between two adjacent light sources in the second direction.

15. The backlight unit of claim 1, wherein:
the light sources comprise a first light source group and a second light source group, each light source group comprising light sources arranged in a direction substantially parallel to the first direction and spaced apart from each other at a uniform distance in the first direction,
at least one light source of the first light source group and at least one light source of the second light source group are alternately arranged in the second direction substantially perpendicular to the first direction, and
the light sources of the first light source group are disposed between light sources of the second light source group in the first direction.

16. The backlight unit of claim 15, wherein the light sources of the first light source group are shifted by half of the distance between two adjacent light sources in the first direction when compared to the light sources of the second light source group.

17. A display apparatus, comprising:
a display panel configured to display an image; and
a backlight unit configured to provide light to the display panel, the backlight unit comprising:
a bottom cover comprising a bottom surface and a sidewall extending from the bottom surface;
light sources disposed on the bottom surface; and
a reflection sheet disposed on an inner surface of the sidewall, outermost ones of the light sources comprising:
a first light source spaced apart from the sidewall by a first distance in a first direction; and
a second light source spaced apart from the sidewall by a second distance different from the first distance in the first direction,
wherein the reflection sheet comprises:
a first reflection sheet disposed between the sidewall and the first light source at a first inclined angle with respect to the bottom surface, and
a second reflection sheet disposed between the sidewall and the second light source at a second inclined angle different from the first inclined angle with respect to the bottom surface.

18. The display apparatus of claim 17, further comprising:
a printed circuit board configured to drive the display panel; and
a flexible printed circuit board electrically connecting the display panel and the printed circuit board.

19. The display apparatus of claim 17, wherein:
the first light source comprises a plurality of first light sources arranged in a first line in the first direction, and
the second light source comprises a plurality of second light sources arranged in a second line in the first direction.

20. The display apparatus of claim 19, wherein:
the outermost light sources further comprise:
third light sources spaced apart from the sidewall in the second direction by a third distance, the third light sources being arranged in a third line in the second direction; and
fourth light sources spaced apart from the sidewall in the second direction by a fourth distance different from the third distance, the fourth light sources being arranged in a fourth line in the second direction, and
the reflection sheet comprises:
a third reflection sheet disposed between the sidewall and the third light source at a third inclined angle; and
a fourth reflection sheet disposed between the sidewall and the fourth light source at a fourth inclined angle different from the third inclined angle.

* * * * *